United States Patent [19]

Brandau et al.

[11] Patent Number: 5,183,493
[45] Date of Patent: Feb. 2, 1993

[54] METHOD FOR MANUFACTURING SPHERICAL PARTICLES OUT OF LIQUID PHASE

[75] Inventors: Egbert Brandau, Alzenau; Hans Huschka, Hanau; Martin Kadner, Maintal; Waldemar Schröder, Hasselroth, all of Fed. Rep. of Germany

[73] Assignee: Nukem GmbH, Alzenau, Fed. Rep. of Germany

[21] Appl. No.: 726,803

[22] Filed: Jul. 8, 1991

[30] Foreign Application Priority Data

Jul. 17, 1990 [DE] Fed. Rep. of Germany ....... 4022648

[51] Int. Cl.[5] ............................................. B22F 9/00
[52] U.S. Cl. ........................................ 75/335; 75/338; 75/342; 75/343
[58] Field of Search .............. 75/335, 338, 342, 343

[56] References Cited

U.S. PATENT DOCUMENTS

| 4,428,894 | 1/1984 | Bienvenu | 75/335 |
| 4,640,806 | 2/1987 | Duerig et al. | 75/335 |
| 4,671,906 | 6/1987 | Yasue et al. | 75/335 |
| 4,774,037 | 9/1988 | Hendricks | 75/335 |

FOREIGN PATENT DOCUMENTS

| 0308933 | 3/1989 | European Pat. Off. | 75/335 |
| 0025904 | 2/1984 | Japan | 75/335 |
| 0191706 | 8/1989 | Japan | 75/335 |
| 8105049 | 6/1982 | Netherlands | 75/335 |

*Primary Examiner*—Upendra Roy
*Attorney, Agent, or Firm*—Cushman, Darby & Cushman

[57] ABSTRACT

To manufacture spherical particles out of liquid phase with a narrow grain spectrum using melting temperatures of up to 1500° C. by generating droplets by means of vibrating nozzles, the liquid phase, the nozzle and the drop distance for the droplets are maintained at a constant temperature of 1° to 10° C. above the melting temperature of the liquid phase until the spherical shape of the falling droplets has stabilized. The particles must then be abruptly chilled.

7 Claims, 2 Drawing Sheets

METHOD FOR MANUFACTURING SPHERICAL PARTICLES OUT OF LIQUID PHASE

DESCRIPTION

The invention relates to a method and a device for manufacturing spherical particles out of liquid phase in the grain size range from 5 μm to 5 mm with a narrow grain spectrum by generating droplets by means of vibrating nozzles and solidification of the droplets so formed in a gaseous or liquid cooling medium.

BACKGROUND OF THE INVENTION

There is a wide range of applications for spherical particles in the grain size range from 5 μm to 5 mm, for example in the field of powder processing, since particles of this type can be handled without causing dust and are easy to pour. The uniformity of the particles and their narrow grain distribution permit good space filling, for example when loading press molds or chromatographic columns. They are in addition suitable as catalyst carriers.

Spherical particles made of metals or alloys are used in soldering engineering, for example, where the requirement for as narrow as possible a grain distribution is ever increasing. The interest in micro-spheres of organic materials instead of dust-producing powder is also increasing, for example in the feedstuffs sector on account of its good disability or in the pharmaceuticals industry for making pharmaceutics with depot effect.

There are also requirements for organic substances that aim at a complete and reproducible space filling, if necessary with optimum space exploitation by means of several fractions of different size but narrow grain distribution, for example in the manufacture of explosives.

There are a number of processes for manufacturing pourable particles of more or less good spherical shape, mostly based on the use of dual-substance nozzles (hollow-cone nozzles), but with a spray effect resulting not in a uniform grain spectrum, but a wide grain size distribution. A further drawback is the dust thereby generated and the formation of particles with very different properties as a result of the solidification of large and small droplets in a cooled drop distance.

To generate micro-spheres monodispersed distribution, methods are known that are based on the disintegration of liquid jets through the effect of mechanical vibrations on the liquid, where the use of periodic oscillations, for example from electro-magnetic oscillation systems, results in monodispersed droplets solidified in different ways.

Most of these methods are based on the use of aqueous solutions and other liquids at room temperature.

The solidification of droplets in these methods is mostly achieved by chemical processes such as precipitation and/or dehydration. These methods are however unsuitable for manufacturing spherical particles from liquid phases with high melting point.

U.S. Pat. No. 2,968,833 proposes a method whereby highly concentrated aqueous solutions of ammonium nitrate are converted into uniform droplets at a temperature of 140° C. with the aid of vibrating nozzle systems, with the droplets solidifying into granulate particles of equal size while dropping through a cooling segment. This method can also be applied to other salts with similar chemical and physical properties, such as ammonium nitrate or area. For liquids with a high melting point, however, this method is not suitable, since no spherical particles are formed at high temperatures or the particles stick together in the cooling segment.

German patent 27 25 924 also described a method of diffusing melted substances under vibration through a nozzle and generating spherical particles by solidification of the droplets in a cooled drop distance. A major drawback of this method is that cooling and solidification of the droplets takes place in a temperature gradient, which can only be controlled with difficulty at higher temperatures in particular. Here too, the particles stick together in the cooling segment at higher temperatures.

SUMMARY OF THE INVENTION

The object of the present invention was therefore to develop a method for manufacturing spherical particles out of liquid phase in the grain size range from 5 μm to 5 mm with a narrow grain spectrum by generating droplets by means of vibrating nozzles and solidifying the droplets so formed in a gaseous or liquid cooling medium, said method to be applicable for substances with a high melting point too. In addition, a suitable device was to be designed.

This object is attained in accordance with the invention in that the liquid phase flowing to the nozzles, the vibrating nozzles and the droplets forming are maintained at a constant temperature until their spherical shape has stabilized, this temperature being 1° to 10° C. above the melting temperature of the liquid phase, and in that the solidification of the droplets after their stabilization is achieved abruptly by chilling with a gaseous or liquid cooling medium whose working temperature is at least 100° C. below the melting temperature of the liquid phase.

The spherical droplets are preferably chilled by the cooling medium which is at least 100° C. colder than the droplet temperature and by continuous feed of the cooling medium in the same direction as the drop direction of the droplets. Liquids with working temperatures close to the boiling point of these cooling liquids have proved particularly useful as cooling mediums.

It is advantageous here to use liquid nitrogen, liquid argon or liquid carbon dioxide, however water mists with working temperatures between 80° and 95° C. are also usable.

This method is particular suited for sphere diameters from 20 μm to 2 mm and for meltable organic and inorganic substances with melting points up to 1500° C. The liquid phases can also contain suspended solids.

The process of droplet formation from a vibrating liquid jet, including droplet formation into a sphere, takes place using the present method within very short periods from a few milliseconds up to a microsecond. The further fate of the round droplets, such as immediate solidification into spheres or the unwelcome formation of the so-called teardrop shape as a result of the effect of friction forces, and the unwelcome melting of the falling droplets into larger particles of every conceivable shape depends on the speed with which the droplets are solidified in this molten state.

In the present method, the process of droplet formation and shaping into a sphere is sharply divided from the solidification process, namely the transition of the liquid droplet to the solid state. This has the great advantage that compliance with a few process parameters is sufficient for the uniform, spherical droplets initially obtained to be preserved as firm spheres with a narrow grain spectrum.

Precise compliance with the above process parameters permits the transposition of the known sphere generation processes at room temperatures to higher temperatures too. It has been found here that the formation of droplets from vibrating liquid jets, droplets shaping into spheres and solidification of the latter with a narrow grain spectrum can also be achieved using substances with high melting points of up to 1500° C. provided the process parameters dependent on the respective material properties are correspondingly adjusted and kept constant.

Observation of the droplet formation process with the aid of a stroboscopic lamp has shown that even with high temperatures and heavy liquids, such as molten lead alloys, the disintegration of the liquid hats into uniform droplets under the effect of vibration proceeds in the same way as at room temperature and with aqueous solutions. After disintegration of the liquid jet, particles of high density however continue to vibrate much more strongly than those of low density, nevertheless they too pass through the stage of exact liquid spheres before they assume the well-known teardrop form. These molten spherical droplets can be turned into solid spherical particles from the liquid state without deformation by selective rapid cooling or chilling. The precondition for this is however that the droplet temperature is only a few degrees higher than the solidification temperature, so that initially only the melting heat or a part thereof sufficient for surface hardening of the particles has to be dissipated.

The remaining heat is then dissipated during the drop in a cooling tower and in a cooled collecting vessel, where fusion of the solid particles can no longer take place.

The cooling medium used can be both a gas, vapor or mist, or a liquid with as low a viscosity as possible. It has been found that the most favorable way of heat dissipation by a cooling medium at as low as possible a temperature, at least 100° C. below the atomizing temperature, is when the flow of the cooling medium is in the same direction as the droplet jets or fall of the droplets. In accordance with the invention, the droplets come into contact with the cold cooling medium for the first time when they have assumed an exact spherical shape. This can be achieved by the cooling medium blowing laterally ont the droplets, but a more advantages method is cooling with the flow in the same direction.

Due to the sensitivity of many substances to oxygen, for example molten metals or organic materials, the cooling medium used for preference is vaporizing liquid nitrogen or vaporizing liquid carbon dioxide.

In the case of high throughputs and particularly where the product permits, a mist of very fine droplets of a liquid close to boiling point is advantageously used as the cooling medium. As a result, the solidification heat of the droplets can be quickly dissipated by the sudden heat consumption when the liquid cooling medium vaporizes.

A method of this type proves particularly economical when very fine water mists of 80° to 95° C. are used.

The vibrating nozzles are preferably driven by electromagnetic oscillating systems, and by piezoelectric or magnetostrictive oscillating systems for very high frequencies. With high throughputs, it is possible to use nozzle plates with up to 100 nozzles.

To perform this method, a device is preferably used that comprises a supply container for the liquid phase, a nozzle head connected to a vibration generator and having one or more nozzles, a feed line between supply container and nozzle head, a drop distance for the droplets, a coolant supply unit and a collecting vessel for the spherical particles. The device is characterized in that the feed line for the liquid phase or a part thereof, the nozzle head, and a variable part of the drop distance above the coolant feed unit is enclosed by a container having thermally insulating walls and having an aperture on its underside in the area of the drop distance.

The container is preferably provided with gas lines for flushing it with inert gas, with the temperature in the interior having to be kept constant within a range from 0.3 to 0.5%.

It is further advantageous if the feed line for the liquid phase has a helical section. This permits slight upward or downward shifting of the nozzle head for adjusting the required drop distance. With larger shifts, the connection between nozzle head and vibration generator must be shortened or extended.

It is furthermore important to keep the oscillating overall mass constant by means of equalizing weights on the nozzle head.

BRIEF DESCRIPTION OF FIGURES OF DRAWING

Exemplary embodiments of the device in accordance with the invention are shown in diagram form in FIGS. 1 and 2.

DESCRIPTION OF PREFERRED EMBODIMENTS

Figure 1:
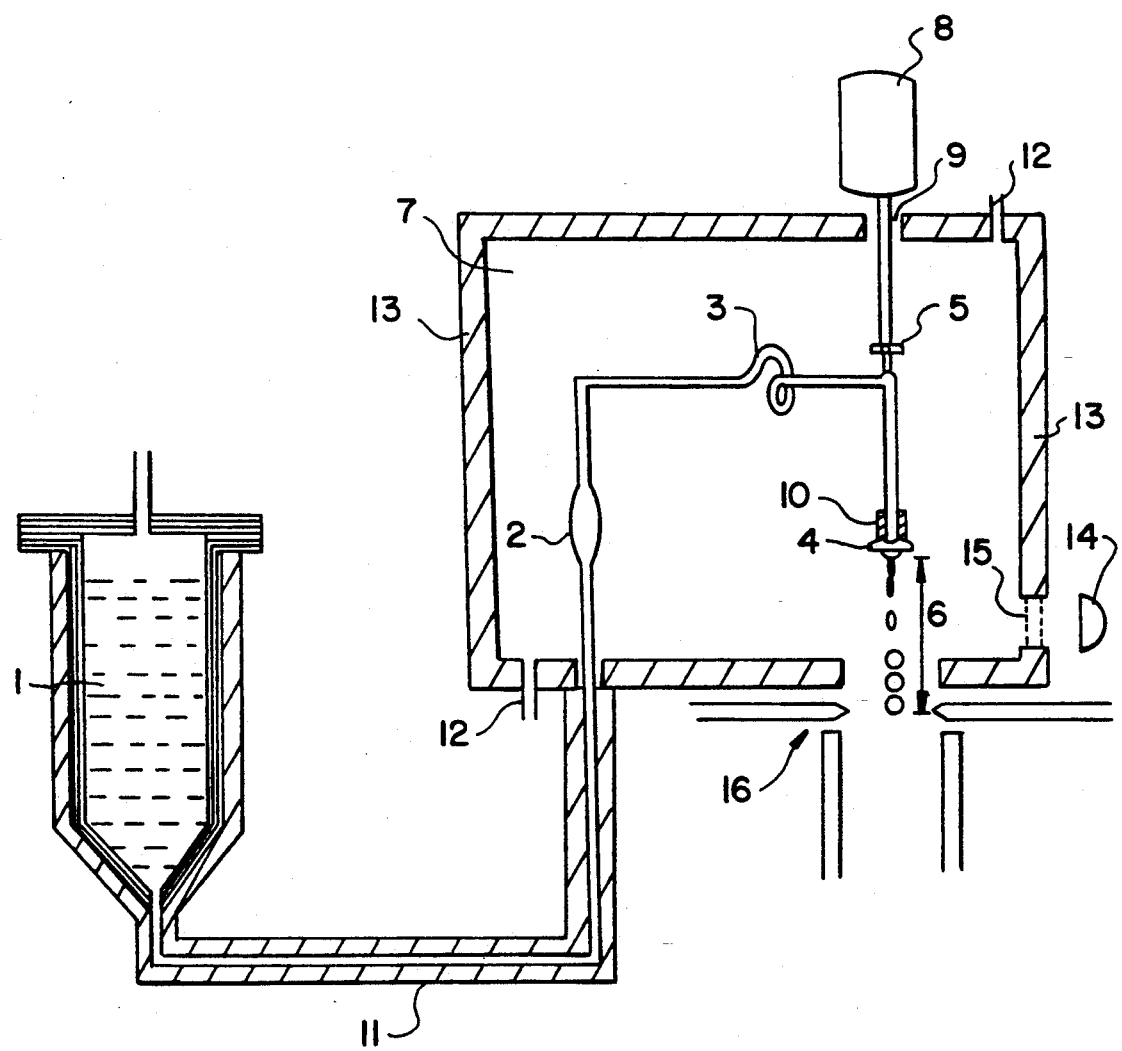

The device is characterized in that the vibrating nozzle head (4), the feed line (2) for the liquid phase from the supply container (1) to the nozzle head and a part of the drop distance (6) are, until the exact spherical shape is achieved, disposed in a closed isothermal container (7) of which the temperature can be kept constant preferably from 0.3 to 0.5% in the range from 50° to 1500° C. The isothermal space can be flushed with an inert gas supplied and discharged via pipelines (12). The vibration generator (8) is disposed outside the isothermal container (7) and connected mechanically to the nozzle head using a thermally insulating leadthrough (9) in such a way that oscillation transmission is ensured in the temperature range up to 1500° C.

The liquid is metered from the supply container (1) to the nozzle head by a feed line (2) having a helical section (3). The oscillating overall mass in the isothermal container (7) is kept constant in the range from 0.1 to 1 kg by means of additional equalizing weights (10).

Figure 2:
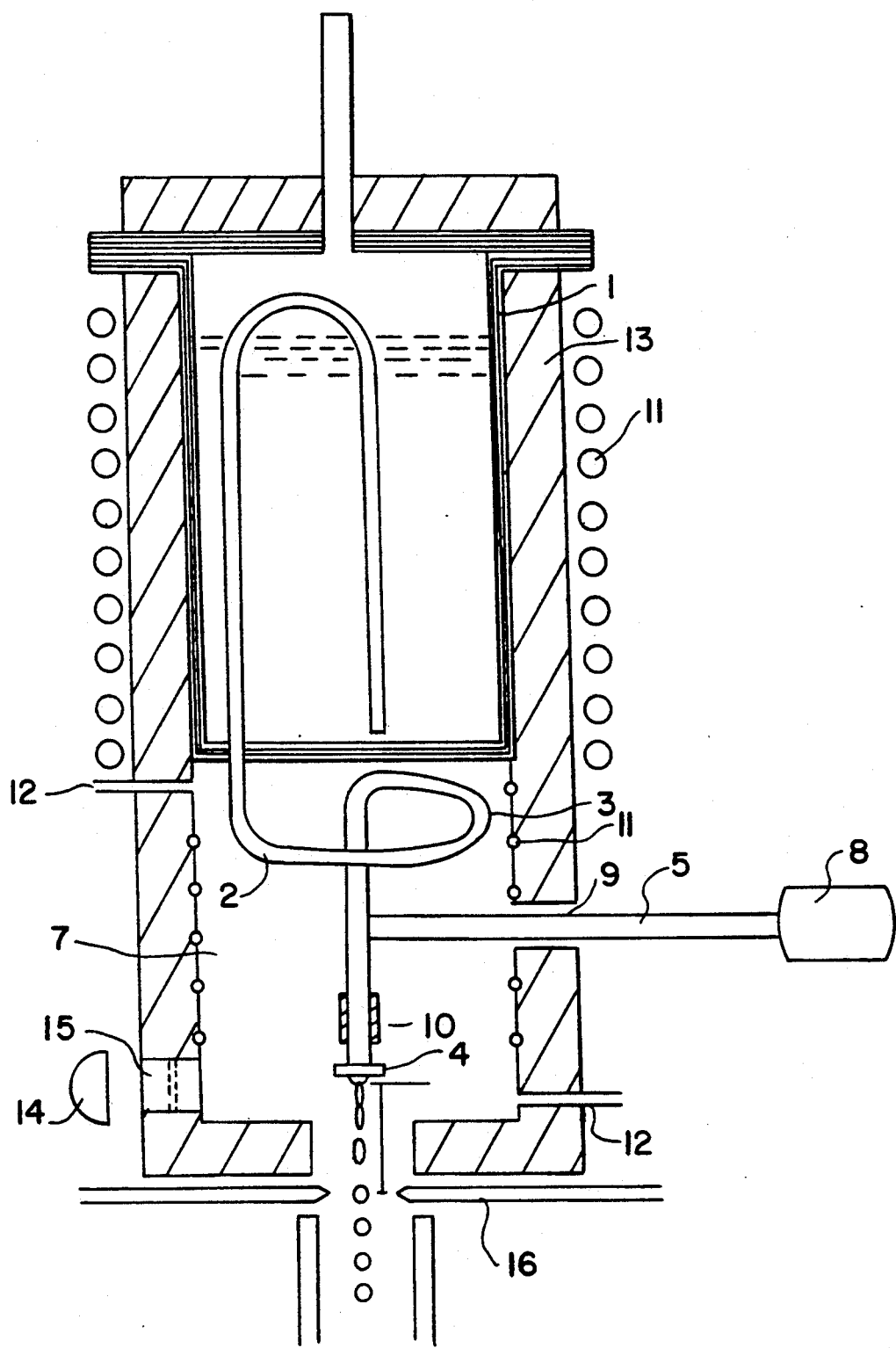

The container (7) has walls (13) made of a thermally insulating material and a large opening only in the area of the drop distance (6). With these devices, the required conditions of constant temperature in the liquid phase metered to the nozzle head (4), in the vibrating liquid jets and in the droplets formed from these until the spherical shape has stabilized is achieved to a major extent. In addition, the required rapid cooling of the droplets by chilling is achieved with these devices, which is a precondition for the production of discrete round spheres without rejects in the form of twins or other special forms, for example. The design according to FIG. 1 is suitable for substances with melting points up to about 800° C. For applications at higher temperatures of up to 1500° C., the version in accordance with FIG. 2 is preferable. In both versions, the molten liquid phase to be converted into droplets is inside a supply container (1) having a heater and insulation.

With the aid of a gas pressure, for example, the liquid phase is passed through the feed line (2) in the isothermal container (7) and the nozzle on the nozzle head (4).

The vibration generator (8) located outside the isothermal container (7) sets the nozzle head (4) periodically oscillating with the aid of a rigid connection (5), as a result of which the liquid jet flowing out of the nozzle disintegrates into uniform droplets. The rigid connection (5) is inside a thermally insulated leadthrough (9) and transmits the oscillations of the vibration generator (8) to the hot nozzle. FIG. 1 shows this in vertical form, FIG. 2 in horizontal form.

In the supply container (1), the substance to be made into droplets is melted or is already available in molten form. In this container, the temperature of the liquid may exceed the melting temperature by slightly more than 10° C., and the temperature fluctuation too may be slightly more than 0.5%.

The feed line (2) leading from the supply container (1) to the nozzle is disposed in the version according to FIG. 1 initially outside the isothermal container (7) and must therefore be heated and thermally insulated. The heater (11) can comprise electric resistance wires.

As soon as the liquid phase enters the feed line (2) inside the isothermal container (7), however, it assumes the temperature set there of 1° to 10° C. above its melting point. The dwell time necessary for this can be adapted to the throughput preferably in an ascending branch and extension of the feed line (2) in the isothermal container (7).

At high temperatures in particular, the materials used must be adapted to the respective requirements dictated by the materials being processed. This can result in the weight of the oscillating mass changing from case to case. The use of different-sized nozzle heads (4) with more or fewer nozzles also alters the weight. To avoid the need to adapt the oscillation system all the time, equalizing weights are preferably attached in front of or on the nozzle head (4) to ensure that the entire oscillated overall mass is almost constant in every case.

The process of droplet formation from a liquid jet flowing out of a nozzle depends—among other things—on the surface tension, density and viscosity of the liquid phase. For this reason, the distance (6) that the droplets fall from the nozzle until formation of the spherical shape must be determined empirically for every liquid phase. For this purpose, a stroboscopic lamp (14) can be used, for example, the flashes of which make the process observable through the vision panel (15). A slight phase shift in the frequency of the stroboscopic lamp compared with that of the vibration generator even permits the observation of the oscillation processes of the droplets after different drop distances, so that the point at which the droplets assume spherical form can be pinpointed. By shifting the nozzle head (4), it is possible to change the drop distance (6) such that the droplets cool at precisely that point at which they have assumed spherical shape.

If it is not possible to make the droplets visible, the conditions for generation of the optimum spherical shape must be determined in a test series using solidified spheres.

The falling droplets are chilled with the cooling medium being blown onto them from the coolant feed unit (16) disposed evenly all around the nozzle head (4). The distance of the coolant feed line (16) to the droplets is a few centimeters. This ensures that the required temperature gradient of at least 100° C. is maintained in controlled form.

Instead of a single nozzle, a nozzle plate with several nozzles of the same size and same bore can be used on the nozzle head. The resultant increase in mass is compensated by corresponding reduction of the equalizing weight.

The optimum number of nozzles on a nozzle plate is decided by the required throughput, the geometrically possible ratios and the required cooling. Adaptation to the oscillating system presents no problems.

The present invention is explained in detail using the following examples.

EXAMPLE 1

In a device according to FIG. 1, extremely pure silver nitrate with a 209° C. melting point was melted in the supply container (1) and maintained at a temperature of 225° C. The feed line (2) leading from there to the isothermal container (7) of a hot cabinet was maintained at a temperature of 220° C. The isothermal container (7) in which the feed line (2), the nozzle head (4) with the nozzle and the drop distance (6) for the formation of the spherical shape are located was set to a working temperature of 215° C. The accuracy of the temperature control was better than +1° C., accordingly less than 0.5%.

The diameter of the nozzle opening on the nozzle head (4) was 350 $\mu$m. The oscillation transmitted by the vibration generator (8) to the nozzle head had a frequency of 800 Hz. With a gas pressure of 0.14 bars achieved with the aid of compressed air, the throughput quantity of molten silver nitrate was 28.5 g/min., corresponding to 7.2 ml/min taking into account the density of 3.96 g/cm$^3$ at the melting point. This corresponds to a throughput of 1.76 kg of silver nitrate per hour and nozzle, in its turn corresponding to the formation of 48,000 droplets per minute and nozzle. The drop distance (6) was set to 5 cm following assessment of this distance as optimum with the aid of the stroboscope (14).

At this point, compressed air was blown from both sides onto the droplets from two 10 mm diameter nozzles of the coolant supply unit (16). The air metered for both nozzles was 500 l/h, the distance of the nozzles to the droplets was set to 2 cm. The compressed air had room temperature, so that the hot silver nitrate droplets solidifed very quickly at a temperature difference of 200° C. A slight suction effect in the drop direction of the droplets resulted in a common flow of droplets and coolant gas and prevented the penetration of cold air into the isothermal container (7).

A total of 940 g of micro-spheres of silver nitrate were produced. The yield of the 630–800 $\mu$m sieve fraction was 98.5%. The diameter distribution was measured using a representative sample, with a mean diameter of 653 $\mu$m being ascertained with a standard percentage divergence of 3.6%. The spheres were glassy-colorless to white and were distinguished by their excellent roundness.

The same test was implemented using a 10-nozzle head (4) with ten equal nozzles of 350 $\mu$m diameter. The temperature in the supply container (1) was 223° C. and in the isothermal container (7) 216° C. with a fluctuation range of less than 0.5%. With an air pressure above the molten material of 0.20 bars and the same frequency of 800 Hz, the flow rate was 334 g/min, corresponding to 84.4 ml/min. This corresponds to a throughput of 20 kg of silver nitrate per hour.

In this case, the droplets of each nozzle were blown from one side only by 10 mm nozzles spaced 2 cm away after the drop distance (6) of 5 cm length. The consumption of compressed air at room temperature for all 10 nozzles was 2500 l/h. In this test, 17.3 kg of micro-spheres were made of silver nitrate, giving a yield of 97% after sieving of the 630–800 μm fraction. A representative sample was measured with the result that the mean diameter was 691 μm and the standard percentage divergence 5.2%.

EXAMPLE 2

A soft solder alloy comprising 63% by weight tin and 37% by weight lead and having a melting point of 183° C. was melted in the supply container (1) as shown in FIG. 1 and kept at a temperature of 190° C., with temperature fluctuations of ±3° C. occurring. At a gas pressure of 0.79 bars, the molten material was passed through the feed line (2) to the nozzle in the isothermal container (7). The temperature of the isothermal container (7) was adjusted to 187° C., with the fluctuation range being less than 1° C. The nozzle opening had a diameter of 120 μm. The nozzle was excited to periodic oscillations with a frequency of 1900 Hz by the vibration generator (8). The isothermal container (7) was flushed free of air with nitrogen gas of the highest purity.

The gas above the molten material in the supply container (1) and the cooling medium were also pure nitrogen.

This prevented oxydization of the highly oxygen-sensitive tin/lead alloy.

The throughput of liquid alloy was 7.2 g/min, giving 114,000 droplets/min. Pure nitrogen gas of 20° C. was blown onto these droplets from both sides out of the nozzles of the coolant supply unit (16). The gas was drawn downwards in the same direction as the micro-spheres by the slight suction. The micro-spheres were collected in a container and then sieved after a drop distance of 3.5 cm, which was additionally cooled to −10° C.

The yield of the 180–250 μm sieve fraction was 91.5%. A representative sample of 1,003 micro-spheres from this sieve batch was measured. The result was a mean diameter of 232 μm and a standard percentage divergence of 2.5%. The mean weight of the micro-spheres was 63.4 μg, corresponding to a thickness of 9.60 g/cm$^3$.

The spheres had excellent roundness: more than 96% of all particles had a diameter ratio of large axis to small axis of better than 1.03. Oxygen analysis of the micro-spheres indicated values of less than 100 ppm.

The same alloy was metered to a vibrating nozzle of 50 μm diameter under similar conditions. At a frequency of 9.450 Hz, corresponding to 567,000 droplets per minute, the throughput was 133 g/h. This single nozzle was then replaced by a nozzle plate (4) with six identical nozzles also of 50 μm diameter.

The frequency of oscillation excitation by the vibration generator (8) was 9,550 Hz, with 573,000 droplets per minute being formed. The throughput per nozzle was 2.10 g/min. This corresponds to a quantity of 756 g/h for the 6-nozzle plate.

The micro-spheres were sieved, with yields, of 93.8 and 88.3% of the 50–125 μm sieve fraction being achieved. Representative samples of these micro-spheres were measured and showed mean diameters of 92 μm and 90 μm and standard percentage divergences of 7.6% and 9.8% respectively.

EXAMPLE 3

For the manufacture of micro-spheres from silver solder, a device in accordance with FIG. 2 was used. The silver solder used had a purity level of 99.9%, was oxide-free and had a melting point of 960° C.

The supply container (1) for the molten silver was a crucible of stainless steel enclosed by insulation means and heated up with the aid of an induction coil.

Underneath the steel crucible was a resistance-heated furnace area with heater (11) and insulation. The molten silver was metered to the nozzle in a feed line (2), likewise of stainless steel, passing through the bottom of the crucible into the isothermal container (7) and shaped there into a coil, thus achieving a certain flexibility. Below the coil, the rigid connection (5) was fastened between vibration generator (8) and nozzle head (4). The nozzle was also of stainless steel and firmly connected to the feed line (2).

In the supply container (1), the molten silver was heated to 974° C., with a temperature fluctuation of ±6° C. occurring. With the aid of argon gas pressure, the molten metal was passed through the feed line (2) in the isothermal container (7) to the nozzle head. The temperature in the isothermal container (7) was adjusted to 966° C. with a fluctuation range of ±0.3%. Before work started, the isothermal container (7) was flushed air-free with extremely pure argon.

A periodic oscillation with the frequency of 200 Hz was transmitted from the vibration generator (8) via the rigid connection (5) to the nozzle head (4). The liquid jet flowing out of the nozzle disintegrated here into 12,000 droplets per minute. After a drop distance (6) of 35 mm length, argon gas at room temperature was blown by the nozzles (6) from the side onto the silver droplets to solidify them abruptly at a temperature difference of several hundred degrees. In the subsequent cooled drop distance, the micro-spheres were completely cooled and after collection in a cooled sheet steel baffle gathered in a steel container.

EXAMPLE 4

As in example 3, a device according to FIG. 2 for manufacturing spherical glass beads was used. The supply container (1), the feed line (2) and the nozzle head (4) with the pouring nozzles were made of platinum.

The glass beads were made from a soda-lime glass consisting of 65% by weight of $SiO_2$, 15% by weight of $Na_2O$ and 20% by weight of CaO+MgO.

In the supply container (1), the temperature of the molten glass was 1450° C., in the isothermal container (7) 1420° C. were set, with a accuracy of ±5° C.

The liquid glass was metered with an air pressure of 1.30 bars through the feed line (2) to the single nozzle of diameter 520 μm. Under the effect of the 500 Hz oscillations of the vibration generator (8), uniform glass droplets formed in the drop distance (6) and were chilled 60 mm below the nozzle in the compressed air flow. The hot glass beads dropped into a cooling tube and were collected at the bottom in a trough of water.

The mean diameter of the glass beads from a representative sample was found to be 995 μm with a standard percentage divergence of 5.2%. The throughput was 2.25 kg of glass per hour in the form of 1.8 million glass beads.

We claim:

1. A method for the manufacture of spherical particles having a grain size in the range 5μ to 5 mm by melting the material from which the particles are formed and solidifying it, said method comprising the steps of
   a) melting said material,
   b) feeding the melted material into a vibrating nozzle,
   c) forming the melted into droplets by allowing them to fall through a first drop zone, the distance through which the droplets fall in said first drop zone being sufficiently high for the droplets of melted material to form into spherical droplets,
   d) maintaining the temperature of said material as it falls through said first drop zone in the range 1° to 10° C. above the melting point of said material,
   e) allowing the droplets to fall through a second drop zone,
   f) solidifying the spherical droplets as they fall through said second drop zone by suddenly chilling them, by maintaining the temperature in said second drop zone at least 100° C. below the melting point of the material,
   g) thermally separating said first drop zone and said second drop zone, and
   h) collecting the solidified droplets.

2. A method as set forth in claim 1 including feeding a cooling medium into said second drop zone.

3. A method as set forth in claim 1 in which the distance through which the droplets fall in said first drop zone is adjustable.

4. A method as set forth in claim 2 in which the temperature of the cooling medium is close to its boiling point.

5. A method as set forth in claim 2 in which the medium is selected from the group consisting of liquid nitrogen, liquid argon and liquid carbon dioxide.

6. A method as set forth in claim 2 in which the cooling medium is fed in the same direction as the drop direction said droplets.

7. A method as set forth in claim 4 in which the temperature of the cooling medium is 5°-20° C. below its boiling point.

* * * * *